UNITED STATES PATENT OFFICE.

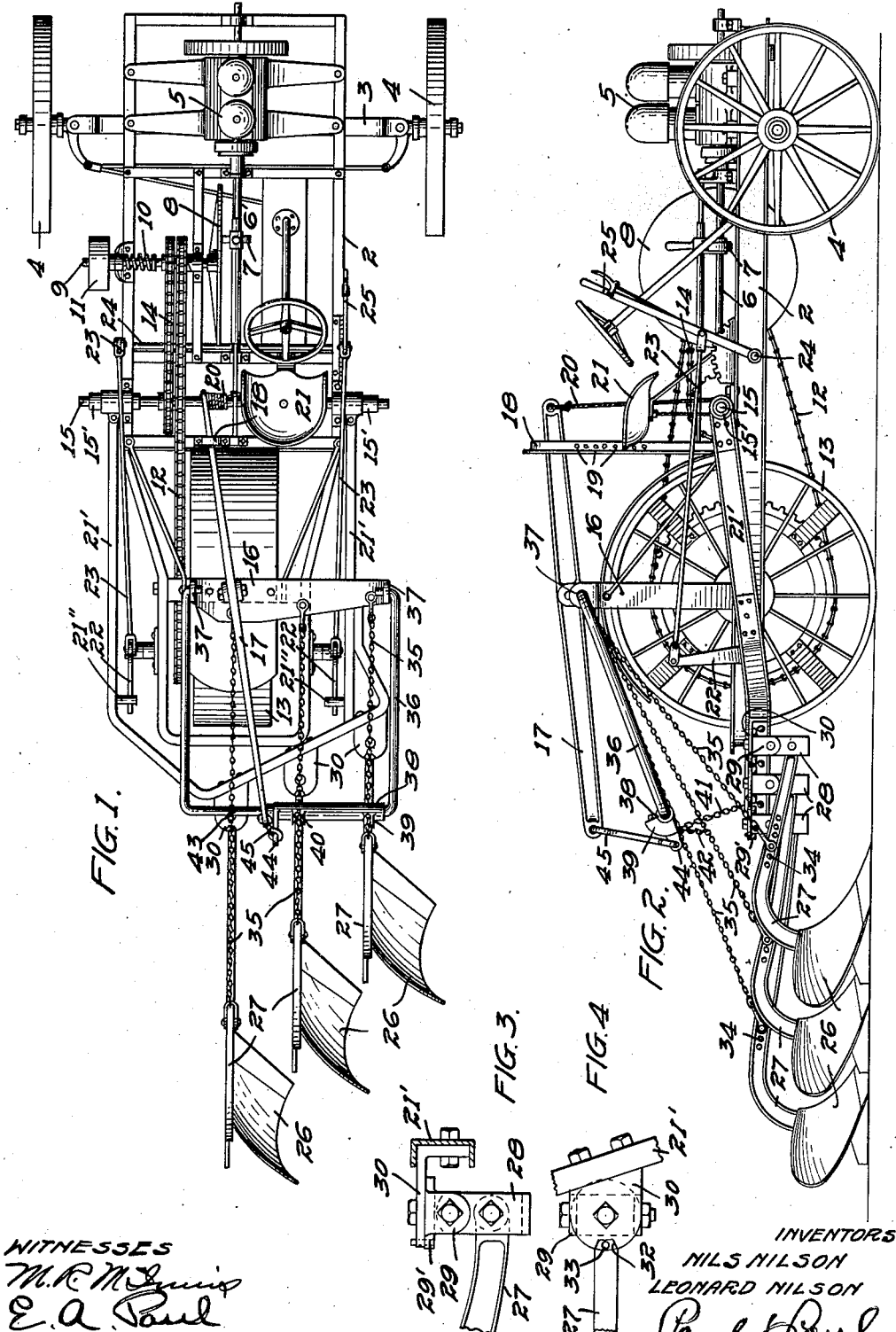

NILS NILSON AND LEONARD NILSON, OF WAYZATA, MINNESOTA.

TRACTOR.

1,328,335.  Specification of Letters Patent.  Patented Jan. 20, 1920.

Original application filed June 5, 1911, Serial No. 631,493. Renewed June 17, 1915, Serial No. 34,741. Divided and this application filed November 12, 1915. Serial No. 61,117.

*To all whom it may concern:*

Be it known that we, NILS NILSON and LEONARD NILSON, citizens of the United States, residents of Wayzata, county of Hennepin, State of Minnesota, have invented certain new and useful Improvements in Tractors, of which the following is a specification.

The primary object of our invention is to provide a tractor with means whereby the draft of the device or implement being drawn by the tractor will operate to increase its traction.

A further object is to provide an implement attachment that is capable of convenient application to a traction engine and may be readily removed therefrom for substitution of another draft attachment.

The invention consists generally in various constructions and combinations, all as hereinafter described and particularly pointed out in the claims.

In the accompanying drawings forming part of this specification,

Figure 1 is a plan view of a traction machine embodying our invention,

Fig. 2 is a side elevation of the same,

Figs. 3 and 4 are detail views showing the preferred means for connecting plow beams to the frame of the machine when the machine is used for pulling plows.

In the drawing, 2 represents a frame having a forward axle 3 and carrying wheels 4. 5 is a source of power mounted on said frame and 6 is a driving shaft actuated by said source of power and having a friction wheel 7 slidably mounted thereon. A friction disk 8 is movable toward and from said wheel 7 and is driven by frictional contact with said wheel. This disk is preferably mounted on a shaft 9 and a spring 10 normally holds it in engagement with said wheel. The outer end of the shaft 9 may be provided with a pulley 11. 12 is a drive chain connecting the shaft 9 with a rear traction wheel 13 which is mounted in bearings in the rear portion of the machine frame and a similar belt 14 connects the shaft 9 with a shaft 15 that extends transversely of the machine frame. A yoke 16 is provided to straddle the wheel 13 and is supported at its lower ends on the frame of the machine. Upon this yoke a bar 17 is centrally pivoted, having its forward end adapted to oscillate vertically in a guide 18 having holes 19 into which pins may be thrust for the purpose of locking the bar in any desired position therein. A cable 20 is attached to the bar 17 and is adapted to be wound on the shaft 15, one end of the cable being conveniently located with respect to the driver's seat 21, so that the driver may manipulate the bar 17 and regulate the period of lifting the plows. A frame 21' is mounted on hubs 15 and projects rearwardly therefrom and carries a plow-beam guiding mechanism, as will hereinafter appear. Bell cranks 22 are pivoted on the machine frame and connected by rods 23 with a rock shaft 24 having an operating lever 25. The frame 21' is provided with pins 21" in the path of the arms of the bell cranks 22, so that when these bell cranks are oscillated the frame 21' will be lifted to raise the plow beams. In this way the depth of the furrow may be controlled.

At the rear of the machine is a series of plows 26 having beams 27. The forward ends of the plow beams are pivotally connected with loops 28 which are in turn pivoted on the lugs 29 of a plate 29' and are adapted to rotate on their pivots and are supported by plates 30 bolted to the frame 21'. The plates 30 have a peripheral notch 32 therein adapted to receive a pin 33 on the plate 29'. The twisting of the machine, as in turning, will be compensated for by the rotation of the plates 29' and the pins thereon will limit the rotary movement of the pivotal connections of the beams with the rear portion of the tilting frame.

The beams 27 are provided with a series of holes 34 in which draft chains 35 are adjustable, said chains extending to a point above the traction wheel and being connected to the yoke 16 so that the pull of the chains in drawing the plows will tend to draw the yoke downwardly and increase the traction of the wheel. The yoke 16, or other suitable draft-attaching means that may be employed, extends above the axis of the traction wheel and the pull of the draft chains thereon tends to lift the forward end of the machine frame and facilitate the turning of the forward carrying wheels in guiding the machine, and at the same time the downward pull of the draft connections exerts a pressure on the traction wheel to force it into the soil and increase the traction. We are thus able to utilize the power of the machine in drawing the plows, without the necessity of weighting the rear portion of the machine, for the draft connections are so arranged that any increase in draft results in a proportionate increase in the tractive power of the machine, and the harder the pull of the plows, the greater the pressure on the traction wheel to hold it in the soil. A bail 36 is pivoted at 37 on said yoke and has a sleeve 38 loosely mounted thereon provided with quadrants 39 and 40, varying in size. Lifting chains 41 and 42 are attached to the draft chains and to the quadrants, and one of said draft chains is connected at 43 to the bail 36. The sleeve 38 has an arm 44 thereon connected by a link 45 with the rear end of the bar 17, so that when said bar is tilted the bail 36 will be lifted and with it the draft chains and the plows, and the varying sizes of the quadrants with respect to one another and to their connection with the bail are such that the plows, instead of being lifted simultaneously, will be lifted one at a time as they approach a predetermined point, so that when all of the plows are lifted out of the ground the furrows will be of the same length and their ends will be in alinement.

While we have shown the tractor as used for pulling plows, it will be understood that it may be used for pulling other implements or devices, and that wherever used the draft of the implement or device being drawn will increase the traction of the machine. We have, in the foregoing specification, pointed out the preferred manner which we contemplate using in applying the principle of our invention, but we do not limit ourselves to the details of construction, the arrangement of the elements herein shown and described, or to the size and proportion of the elements illustrated, as the same may be varied in many particulars without departing from our invention or the scope of the claims herein.

We claim as our invention:

1. The combination, with a frame having forward guiding means and a rear traction wheel, of a draft-attaching means secured to said frame and extending above the axis of said wheel, and a draft means connected with the upper portion of said draft-attaching means, whereby the pull of said draft means upon said attaching means will increase the traction of said wheel and a beam having a non-draft guiding connection with said frame and a connection with said draft means in the rear of said guiding connection.

2. The combination, with a frame having forward guiding means and a rear traction wheel, of a draft-attaching means mounted on said frame, and straddling said wheel, and a draft means connected with said draft-attaching means above the axis of said wheel, whereby the pull of said draft means upon said attaching means will increase the traction of said wheel, a member having a pivotal non-draft guiding connection with said frame and attached to said draft means in the rear of said guiding connection.

3. The combination, with a frame having forward guiding means and a rear traction wheel and non-draft guiding connections for attachment to the load to be drawn, of a draft means connected with the load and with said frame above the axis of said traction wheel for exerting a downward pressure on said wheel to increase the traction thereof, the connection of said draft means with the load being in the rear of said guiding connections.

In witness whereof, we have hereunto set our hands this 3rd day of November, 1915, and 5th day of Nov., 1915.

NILS NILSON.
LEONARD NILSON.

Witness:
G. W. HELMER.